United States Patent [19]

Krause

[11] Patent Number: 5,252,346

[45] Date of Patent: Oct. 12, 1993

[54] ANIMAL FEED SUPPLEMENT

[75] Inventor: Vernon E. Krause, Norfolk, Nebr.

[73] Assignee: Harvest States Cooperatives, Norfolk, Nebr.

[21] Appl. No.: 974,239

[22] Filed: Nov. 10, 1992

[51] Int. Cl.$^5$ .............................................. A23K 1/00
[52] U.S. Cl. ........................................ 426/74; 426/623; 426/630; 426/635; 426/658; 426/661; 426/807
[58] Field of Search ................. 426/635, 658, 807, 74, 426/623, 630, 661, 807

[56] References Cited

U.S. PATENT DOCUMENTS

| | | | |
|---|---|---|---|
| 3,684,518 | 8/1972 | Wortham | 99/2 N |
| 3,982,027 | 9/1976 | Valeur et al. | 426/69 |
| 3,988,483 | 10/1976 | Deyoe et al. | 426/69 |
| 4,055,667 | 10/1977 | Linton | 426/807 |
| 4,232,046 | 11/1980 | Deyoe et al. | 426/69 |
| 4,247,561 | 1/1981 | Nelson | 426/53 |
| 4,267,197 | 5/1981 | Sawhill | 426/658 |
| 4,379,844 | 4/1983 | Young | 435/251 |

*Primary Examiner*—R. B. Penland
*Attorney, Agent, or Firm*—Zarley, McKee, Thomte, Voorhees & Sease

[57] ABSTRACT

A method for preparing a thixotropic animal feed suspension includes the steps of providing a liquid sugar solution and mixing a nongellatinized starch containing ingredient into the liquid sugar solution and thence mixing a dry bulk feed nutrient into the sugar and starch mixture to form a thixotropic suspension. All mixing steps are accomplished at ambient temperatures and the starch containing ingredient is preferably selected from feed stuffs, from wheat, corn, milo and mixtures thereof. The suspension resulting from this method is stable for long periods of time and at very low temperatures.

3 Claims, No Drawings

ANIMAL FEED SUPPLEMENT

TECHNICAL FIELD

The present invention relates generally to animal feed supplements, and more particularly to liquids for animal feeds which have thickening or stabilizing agents incorporated therein to slow the stratification of components in the liquid slurry and form a stable, thixotropic suspension.

BACKGROUND OF THE INVENTION

Liquid feed supplements for cattle feed, as well as other livestock feed, are well-known in the feed industry. These liquids contain mostly minerals and additives that are not soluble, thereby requiring a thickening agent to slow the stratification of components in the liquid slurry, and to thereby increase the stability and shelf life of the product. In the prior art, clays and gums were commonly utilized as thickening or stabilizing agents.

While starches have been utilized in the past as a thickening agent, the prior art calls for heating and/or cooking the mixture in order to cause the thickening and stabilization of the mixture.

It is therefore a general object of the present invention to provide an improved feed supplement which utilizes starch as a stabilizing agent.

Another object of the present invention is to provide a method for making an edible liquid feed supplement for livestock, which does not utilize heat to cause thickening of the mixture.

These and other objects will be apparent to those skilled in the art.

SUMMARY OF THE INVENTION

The method for preparing a thixotropic animal feed suspension includes the steps of providing a liquid sugar solution and mixing a nongellatinized starch containing ingredient into the liquid sugar solution and thence mixing a dry bulk feed nutrient into the sugar and starch mixture to form a thixotropic suspension. All mixing steps are accomplished at ambient temperatures and the starch containing ingredient is preferably selected from feed stuffs, from wheat, corn, milo and mixtures thereof. The suspension resulting from this method is stable for long periods of time and at very low temperatures.

DESCRIPTION OF THE PREFERRED EMBODIMENT

The method of this invention comprises an improved manufacture of liquid animal feed supplements using a starch containing compound as a thickening and stabilizing agent for a liquid solution comprised primarily of liquid molasses sources. The starch containing compounds replace more expensive thickening agents commonly utilized in the prior art, such as clays and gums. The resulting thixotropic suspension is utilized as a feed supplement having insoluble minerals and additives.

The following table sets forth the proportions of the ingredients which are used in the method of the invention:

TABLE 1

| Ingredient | Lb/Ton | | |
|---|---|---|---|
| | A | B | C |
| 1. Condensed Delactosed Whey | 614 | 360 | 297 |
| 2. 100% Urea/Whey (Premix) | 513 | 757 | 931 |
| 3. Salt | 48 | 54 | 76 |
| 4. Potassium Chloride | 60 | 68 | 71 |
| 5. Ammonium Sulfate | 35 | 35 | 31 |
| 6. Liquid Vitamins A & D | .37 | .50 | .50 |
| 7. Trace Minerals | 8.33 | 12.50 | 12.50 |
| 8. Vitamin E, 227 | .09 | .09 | .09 |
| 9. Limestone (325 Mesh) | 407 | 418 | 432 |
| 10. Red Dog | 270 | 210 | 100 |
| 11. Ammonium Polyphosphate | 37 | 86 | 10 |
| 12. Phosphoric Acid | — | — | 37 |
| 13. Selenium 1600 | 3.6 | — | 3.8 |
| 14. Kelflo | — | — | .75 |

The 100% urea/whey component is a premix consisting of approximately 50.5% whey and 49.5% urea. Cane, beet or corn sugars may be substituted for the condensed delactosed whey in this formula. The thickening agent disclosed in the above table is red dog. However, any starch containing feed stuff from wheat, corn and/or milo may be utilized. In addition, these feed stuffs may be whole kernel or separations of the kernel and still be effective as a stabilizing agent. Phosphoric acid may be substituted for or added to the ammonium polyphosphate shown in the table.

The method of the invention comprises combining all ingredients, including the starch-containing component at ambient temperature to provide a stable, thixotropic suspension.

EXAMPLE 1

On page 4 of the application, the formulation described in formula A of Table 1 provides a thixotropic suspension consisting of a minimum of 32 percent crude protein. An 8 ton batch of formula A was prepared by initially preparing a premix of 50.5% whey and 49.5% urea. Then, all liquid components of the formula were mixed for 15 minutes. The salt, potassium chloride, ammonium sulfate and ammonium polyphosphate were then added to the mixture and blended for 15 minutes. The thickening agent, red dog, was gradually added and blended over the next 18 minutes. The dry bulk ingredient, limestone, was then blended to the mixture for 12 minutes, and the final solution was then mixed for 10 minutes to reach the desired stable, thixotropic suspension. Preferably, the suspension is mixed at a rate of 1.25 pounds to 1.75 pounds with grain and roughage per head of cattle per day.

EXAMPLE 2

On page 4 of the application, the formulation described in formula A of Table 1 provides a thixotropic suspension consisting of a minimum of 45 percent crude protein. An 8 ton batch of formula A was prepared by initially preparing the urea/whey premix and then mixing the liquid components of the formula for 15 minutes. The salt, potassium chloride, ammonium sulfate and ammonium polyphosphate were then added to the mixture and blended for 15 minutes. The thickening agent, red dog, was gradually added and blended over the next 26 minutes. The dry bulk ingredient, limestone, was then blended to the mixture for 12 minutes, and the final solution was then mixed for 10 minutes to reach the desired stable, thixotropic suspension. Preferably, the suspension is mixed at a rate of 0.75 pounds to 1.25 pounds with grain and roughage per head of cattle per day.

The above examples provided a stable, thixotropic suspension which would remain stable for at least three weeks on the shelf at temperatures as low as 0°–10° F. Because all preparation and mixing was conducted at ambient temperature, the cost for preparation of the mixture is much less than those mixtures requiring heating or other cooking.

EXAMPLE 3

The third formula described in Table formula C, is considered a "winter formula", because the thixotropic suspension remains stable down to temperatures −18° F. The minimum crude protein content of the formula C is 50 percent. An 8 ton batch of formula A was prepared by initially preparing the urea/whey premix and then mixing the liquid components of the formula for 15 minutes. The salt, potassium chloride, ammonium sulfate and ammonium polyphosphate were then added to the mixture and blended for 15 minutes. The thickening agent, red dog, was gradually added and blended over the next 26 minutes. The dry bulk ingredient, calcium carbonate, was then blended to the mixture for 12 minutes, and the final solution was then mixed for 10 minutes to reach the desired stable, thixotropic suspension. Preferably, the suspension is mixed at a rate of 1.25 pounds to 1.75 pounds with grain and roughage per head of cattle per day.

All three of the above-described examples produce suspensions having a moisture content of approximately 32–34 percent of the total suspension when measured by weight. Each formulation may be efficiently and economically produced by virtue of the use of nongellatinized starches in place of clays and gums, yet mixed an ambient temperatures without the need for heating. Preferably, the quantity of starches are added to create the desired viscosity which is between 5 and 14 percent by weight of the total suspension. The resulting suspensions remain thixotropic even at very low temperatures.

Whereas the invention has been shown and described in connection with the preferred embodiments thereof, it will be understood that many modifications, substitutions and additions may be made which are within the intended broad scope of the appended claims.

I claim:

1. A method for the preparation of a thixotropic animal feed suspension supplement consisting essentially of the steps of:
    producing an ambient temperature liquid sugar solution containing approximately 14–31 weight percent lactose or sucrose sugars;
    simple mixing 5–14 weight percent of an ambient temperature nongellatinized starch containing ingredient into the liquid sugar solution; and
    simple mixing ambient temperature dry bulk calcium carbonate animal feed nutrients from 20–25 weight percent, into the ambient temperature sugar and starch mixture to form a thixotropic suspension without heating the mixture or its components;
    said mixing steps all being accomplished at ambient temperatures, said supplement being stable for at least three weeks at temperatures as low as +10° F.

2. The method of claim 1, wherein said starch containing ingredient is selected from the group consisting of feed stuffs from wheat, corn, milo and mixtures thereof.

3. The method of claim 2, wherein said feed stuffs are whole kernel feed stuffs.

* * * * *